(12) United States Patent
Brewer et al.

(10) Patent No.: US 10,650,463 B2
(45) Date of Patent: May 12, 2020

(54) PRIVATE NETWORK INTERFACE SYSTEM AND METHOD

(71) Applicant: HARTFORD FIRE INSURANCE COMPANY, Hartford, CT (US)

(72) Inventors: Seth Brewer, New Britain, CT (US); Ryan Owen Denning, West Hartford, CT (US); Mushter Munib Moin, Newington, CT (US); Deborah L. Perschy, Southington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 697 days.

(21) Appl. No.: 15/353,663

(22) Filed: Nov. 16, 2016

(65) Prior Publication Data
US 2017/0178243 A1 Jun. 22, 2017

Related U.S. Application Data

(63) Continuation of application No. 13/588,576, filed on Aug. 17, 2012, now abandoned.

(60) Provisional application No. 61/659,749, filed on Jun. 14, 2012.

(51) Int. Cl.
  *G06Q 40/08* (2012.01)
  *G06Q 50/00* (2012.01)
  *H04L 12/58* (2006.01)
  *H04W 4/021* (2018.01)

(52) U.S. Cl.
  CPC ............ *G06Q 40/08* (2013.01); *G06Q 50/01* (2013.01); *H04L 51/32* (2013.01); *H04W 4/021* (2013.01)

(58) Field of Classification Search
  CPC ....................................................... G06Q 40/08
  USPC ............................................................ 705/4
  See application file for complete search history.

(56) References Cited

U.S. PATENT DOCUMENTS

| 5,890,129 | A  | 3/1999 | Spurgeon        |
|-----------|----|--------|-----------------|
| 6,571,216 | B1 | 5/2003 | Garg et al.     |
| 7,050,818 | B2 | 5/2006 | Tendler         |
| 7,596,515 | B2 | 9/2009 | Eckel, Jr.      |
| 7,925,523 | B1 | 4/2011 | McConnell et al.|

(Continued)

OTHER PUBLICATIONS

Anonymous "News—Social Networking" Oct. 23, 2008, Post Magazine, p. 3.

(Continued)

*Primary Examiner* — Samica L Norman
*Assistant Examiner* — Murali K Dega
(74) *Attorney, Agent, or Firm* — Howard IP Law Group, PC

(57) ABSTRACT

A network generation system is configured to generate a private computerized network in response to detection by the system of the occurrence of an event. A mobile device application installed on an entity mobile device is configured to receive and transmit event data and GPS-based location data. A network server is configured to receive the event data and the GPS-based location data. A computer server based processing platform is configured to proactively extract resource provider data corresponding to resource providers based upon event data, entity data, event location data, and at least one resource data API. The computerized private network is generated and separate interfaces are generated for the entity, an event processor, and at least one resource provider.

20 Claims, 7 Drawing Sheets

(56) References Cited

U.S. PATENT DOCUMENTS

| | | |
|---|---|---|
| 8,060,117 B1 | 11/2011 | Tendler |
| 8,095,425 B2 | 1/2012 | Morrow |
| 8,108,501 B2 | 1/2012 | Birnie et al. |
| 8,145,275 B2 | 3/2012 | Cunningham et al. |
| 8,199,697 B2 | 6/2012 | McNamara et al. |
| 8,296,356 B2 | 10/2012 | Obasanjo et al. |
| 8,306,874 B2 | 11/2012 | Morgenstern et al. |
| 8,340,983 B2 | 12/2012 | Grover et al. |
| 8,543,430 B1 | 9/2013 | Fields et al. |
| 8,639,535 B1 | 1/2014 | Kazenas |
| 8,639,629 B1 | 1/2014 | Hoffman |
| 8,645,014 B1 * | 2/2014 | Kozlowski ............... H04W 4/70 |
| | | 701/24 |
| 8,666,376 B2 | 3/2014 | Ramer et al. |
| 8,799,028 B1 | 8/2014 | Warden et al. |
| 2001/0037265 A1 | 11/2001 | Kleinberg |
| 2002/0035528 A1 | 3/2002 | Simpson et al. |
| 2002/0188484 A1 | 12/2002 | Grover et al. |
| 2002/0194033 A1 | 12/2002 | Huff |
| 2007/0226014 A1 | 9/2007 | Alemayehu et al. |
| 2007/0271272 A1 * | 11/2007 | McGuire ............. G06F 16/9535 |
| 2008/0104227 A1 | 5/2008 | Birnie et al. |
| 2008/0228531 A1 | 9/2008 | Kenedy et al. |
| 2008/0281726 A1 | 11/2008 | Gupta |
| 2008/0288298 A1 * | 11/2008 | Dattatreya ............. G06Q 40/00 |
| | | 705/4 |
| 2009/0037211 A1 | 2/2009 | McGill et al. |
| 2009/0112701 A1 | 4/2009 | Turpin et al. |
| 2009/0192865 A1 | 7/2009 | Soza et al. |
| 2010/0205014 A1 | 8/2010 | Sholer et al. |
| 2010/0318571 A1 | 12/2010 | Pearlman et al. |
| 2010/0324941 A1 | 12/2010 | Stevenson et al. |
| 2011/0112957 A1 | 5/2011 | Ingram et al. |
| 2011/0131076 A1 | 6/2011 | Leidner et al. |
| 2011/0137975 A1 | 6/2011 | Das et al. |
| 2011/0145023 A1 | 6/2011 | Stahl et al. |
| 2011/0153368 A1 | 6/2011 | Pierre et al. |
| 2011/0159890 A1 | 6/2011 | Fortescue et al. |
| 2011/0161119 A1 | 6/2011 | Collins |
| 2011/0320341 A1 | 12/2011 | Kremen |
| 2011/0320342 A1 | 12/2011 | Kremen |
| 2012/0095861 A1 | 4/2012 | Feng et al. |
| 2012/0116550 A1 | 5/2012 | Hoffman et al. |
| 2012/0157113 A1 | 6/2012 | Brisebois et al. |
| 2012/0221357 A1 | 8/2012 | Krause et al. |
| 2012/0245963 A1 * | 9/2012 | Peak ...................... G06Q 50/01 |
| | | 705/4 |
| 2012/0290329 A1 | 11/2012 | Ross |
| 2012/0296731 A1 | 11/2012 | Ross |
| 2013/0124294 A1 | 5/2013 | Peak et al. |
| 2013/0185189 A1 | 7/2013 | Stewart |
| 2013/0222133 A1 * | 8/2013 | Schultz .................. G08G 1/205 |
| | | 340/539.13 |

OTHER PUBLICATIONS

BusinessWire, "Farmers Insurance Now Offers a Discount to Engineers, Firefighters, Police Officers, Physicians and Surgeons, Registered Nurses, Scientists and Teachers in Missouri", Aug. 11, 2003, 2 pages.

Ernst & Young, "Time for Insurers to Rethink their Relationships", Feb. 20, 2012, 40 pages.

Ha, Young, "In Few Years, Social Network Data May Be Used in Underwriting", Oct. 13, 2011, Insurance Journal, 4 pages.

IBM, "Insurance in the Age of Analytics", Apr. 2012, 8 pages.

IEEE, "IEEE Sponsored Discounts", Accessed via the Wayback Machine, Apr. 3, 2011, <www. ieee.orgmembership_servicesmembershipdiscountsfaq.html>, 4 pages.

Larocco, Michael, "Ultra-Niche Advertising, Cherry Picking Now Possible With Facebook, Google Ads", Nov. 22, 2010, PropertyCasualty360.com, 4 pages.

Nance-Nash, Sheryl, "What Insurers Could Do With Your 'Social Media Score'", Dec. 12, 2011, AOL.com, 4 pages.

Pavel's Insurance Blog, "Affinity Discount—Your Occupation can Save Money on Insurance", Aug. 20, 2010, 2 pages.

PWC, "Insurance 2020: Turning change into opportunity", Jan. 2012, 24 pages.

Ramasastry, Anita, "Will Insurers Begin to Use Social Media Postings to Calculate Premiums? A Look at Some Startling Trends and the Possible Consequences for Consumers", Jan. 3, 2012, Verdict.justia.com, 15 pages.

Schaerer, et al., "Transforming the Insurance Industry to Increase Customer Relevance", Mar. 2011, CISCO White Paper, 13 pages.

Scism et al., "Insurers Test Data Profiles to Identify Risky Clients" Nov. 19, 2010, Wall Street Journal, 4 Pages.

Voelker, Michael, "Social Media: Reach Out and Touch Someone", May 1, 2012, PropertyCasualty360, 9 pages.

Weiss, Marie-Andree, "Social Media Sites and Underwriting", Accessed via The Wayback Machine Dec. 15, 2011, <http:apps.americanbar.orgbusiawcommitteesCL320000pubnewsletter201101weiss.pdf>, 3 pages.

\* cited by examiner

PRIVATE NETWORK INTERFACE SYSTEM
AND METHOD

CROSS REFERENCE TO RELATED
APPLICATIONS

The present application is a continuation of U.S. patent application Ser. No. 13/588,576, filed on Aug. 17, 2012, which is in turn based on, and claims benefit of and priority to U.S. Provisional Patent Application Ser. No. 61/659,749 filed on Jun. 14, 2012, the contents of all of which are hereby incorporated herein by reference in their entirety for all purposes.

FIELD

The present application relates to digital communication networks, and particularly to private digital communication networks.

BACKGROUND

Many insurance related events require the involvement of one or more service providers to assist in responding to the event. For example, an insured driver who is involved in an automobile accident while far from home may need assistance from several different service providers to deal with the accident, including a tow truck provider, a rental car agency, an automobile repair shop, and a hotel. Often, when an insured driver has such an accident, the driver must either consult their insurance policy to determine what services are covered, call their insurance carrier to file a first notice of loss, and/or keep their receipts and hope that their policy will reimburse the costs of the service providers selected by the insured driver.

Other types of insurance related events require similar levels of involvement. For example, an insured homeowner who suffers damage from a fire may need temporary housing, transportation, clothing, and a contractor to repair the damage. Unfortunately, insured individuals often are unable to quickly contact, interact with, and manage their interactions with service providers that are covered under their insurance policy. Further, individuals who suffered an insurance related event (such as an accident, fire or the like) often are not in a position to contact appropriate service providers. For example, a driver who just suffered a traumatic accident may not necessarily be able (or want) to search for the most appropriate car rental agency.

Further, as consumers become more connected and reliant on the use of social networks to share information about their location, status and activities, they increasingly notify others in their social network of accidents or other events even before they consider contacting their insurance provider. For example, an insured driver who is involved in an accident may immediately publish an update on her Twitter® or Facebook® account notifying those in her social network of the accident.

It would be desirable to use social networks and social media to respond to insurance related events. Further, it would be desirable to identify insurance related events through monitoring of social networks.

DETAILED DESCRIPTION

Figure 1:
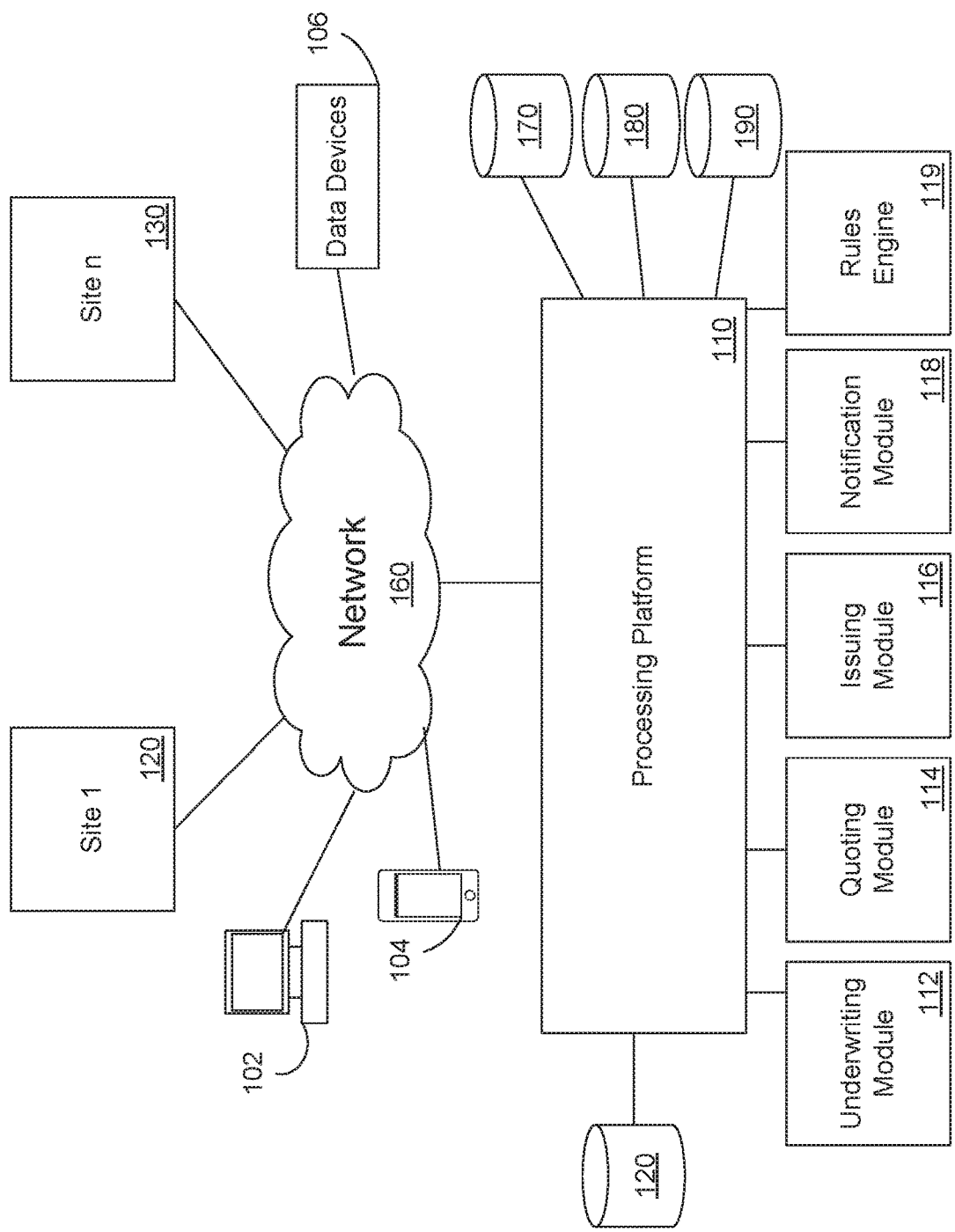
FIG. 1 is block diagram of a system according to some embodiments of the present invention.

Pursuant to some embodiments, systems, methods, apparatus and computer program code for responding to insurance related events are provided. Pursuant to some embodiments, event data associated with an insurance related event are received, and cause the analysis of the event data, the identification of an insured entity and an affected insurance policy, the establishment of a support network for response to the insurance related event, and the communication of information associated with the support network to an insured entity. In some embodiments, the support network is a social network that includes the insured as well as one or more service providers selected based on the affected insurance policy, the insured, and the insurance related event.

Features of some embodiments will now be described by first referring to FIG. 1 which is a block diagram of an insurance processing platform 100 according to some embodiments of the present invention. The platform 100 may, for example, facilitate the administration of insurance policies using community, social and business network based data such as information published by individuals or businesses (e.g., via Twitter, Facebook, Google+, or the like), as well as information shared by individuals or businesses via applications, memberships, or the like. For illustrative, but not limiting, purposes such information may be published by sites or networks including EBAY.COM, FACEBOOK.COM, LINKEDIN.COM, TWITTER.COM, BLOGGER.COM, MYSPACE.COM, FRIENDSTER.COM, GOOGLE+, and other similar sites. Information may also be obtained from applications (such as those provided through the APPLE® store, the ANDROID® marketplace or the like) and devices (such as mobile phones, navigation systems, desktop computers or the like). For clarity and ease of exposition, individuals and businesses using features of the present invention to receive insurance services and information may generally be referred to herein as "consumers" or the "insured entity".

According to some embodiments, an insurance processing platform 110 may be provided for receiving, evaluating, and taking action (such as initiating notifications, making underwriting decisions, issuing policies, etc.) based on social network and other data received from a number of different sources. By way of example only, the insurance processing platform 110 may be associated with and/or communicate with (or receive information about) customers, prospects, or other individuals and entities operating a variety of devices, including, for example, personal computers 102 (including desktop, laptop, tablet, or other types of computers), mobile devices 104 (such as mobile telephones), and other data devices 106 (such as sensors, networked devices, or the like).

The insurance processing platform 110 may, according to some embodiments, operate to perform a number of insurance-related activities, including the administration and support of a number of different types of insurance policies, including personal lines, workers compensation, health, and other commercial policies. Pursuant to some embodiments, insurance processing platform 110 receives data from a wide variety of sources including one or more social media or other websites or properties 120-130 and devices 102, 104, 106. The data received is used to enhance interactions with consumers and insured individuals and businesses. Further, insurance processing platform 110 may transmit data and notifications to consumers and insured individuals and businesses directly to devices 102, 104 or 106 or through one or more social media sites 120-130.

Further, pursuant to some embodiments, insurance processing platform 110 may cause the creation, maintenance, and updating of one or more support networks which are created in response to insurance related events as described herein. Those support networks may be created using platforms such as one or more existing social media sites 120-130. For example, in one illustrative embodiment, an insurance company may use the infrastructure of an existing social network (such as that provided by Facebook® or Google+®) to create private social networks for insured individuals in response to an insurance related event. Such private social networks may be created on a subdomain or other secure area of the existing social network so that the participants in the private social network are limited in a secure and controlled manner. As used herein, the term "support network" or "private social network" is used to refer to a social network created in response to identification of an insurance related event.

As used herein, devices including those associated with the insurance processing platform 110, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Sites 120-130 may store, publish or otherwise provide access to information about consumers. For example, a consumer with a Facebook account may post status updates, information and comments to Facebook, and Facebook may publish or otherwise make the status updates, information or comments available to authorized individuals or entities. In some embodiments, one or more of the sites 120-130 may publish or otherwise disseminate the information via an application programming interface ("API"), an RSS feed, or some other structured format. The information may be analyzed or used by the insurance processing platform 110 on an individual item basis or on an aggregate basis with other information. Further the data may be combined with one or more other data sources, such as publicly available data disseminated by local police or fire authorities, or the like.

As shown, the insurance processing platform 110 may include a number of modules or components, including one or more underwriting modules 112, quoting modules 114, issuing modules 116, notification modules 118 and rules engine 119. Insurance processing platform 110 may be deployed as a number of different platforms in communication with each other (for example, one insurance processing platform may be deployed as an underwriting platform, while another may be deployed to function as a policy issuance platform). Pursuant to the present invention, the notification modules 118 may be used to transmit information to insured individuals, to service providers, and to other entities, including information relating to one or more support networks established pursuant to the present invention. In some embodiments, one or more rules engines 119 may be provided to receive data associated with an insurance related event and determine appropriate actions (including appropriate notifications to be transmitted by notification modules 118, service providers to contact, or the like). In some embodiments, application of rules by the rules engines 119 may result in a first notice of loss ("FNOL") being generated in response to an insurance related event.

As will be described further below, the underwriting modules 112 may be used in conjunction with the creation and updating of one or more rating schedules for use in pricing and rating insurance policies pursuant to embodiments of the present invention. For example, in some embodiments, the underwriting modules 112 are used to analyze both conventional underwriting data such as historical loss information in conjunction with social and business network based data for use in rating and pricing business insurance policies. Referring still to FIG. 1, the quoting and issuing modules 114 and 116 may be used in conjunction with the quoting, rating and pricing of insurance policies (e.g., in response to requests for quotes received from a mobile device, web server or agents operating agent devices, etc.). Note that the underwriting module 112, quoting module 114, and/or issuing module 116 may be associated with various types of insurance policies, including automobile and home insurance policies, for individuals and/or companies.

Although a single insurance processing platform 110 is shown in FIG. 1, any number of such devices may be included. Moreover, various devices described herein might be combined according to embodiments of the present invention. For example, in some embodiments, the insurance processing platform 110 and modules 112-118 might be co-located and/or may comprise a single apparatus. In some embodiments, some or all of the underwriting analysis may be performed using a spreadsheet based program or other analytic program utilizing one or more servers or server farms in a network based environment.

The insurance processing platform 110 and the modules 112-118 may also access information in one or more databases 170, 180 and 190. The databases may include, for example, risk characteristic data 170, historical loss data 180 associated with previously-issued insurance policies, and policy data 190 associated with active policies. As will be described further below, the policy data 190 may be used to process information associated with insurance related events to identify appropriate service providers and support network features needed to provide support an insured individual.

Figure 2:
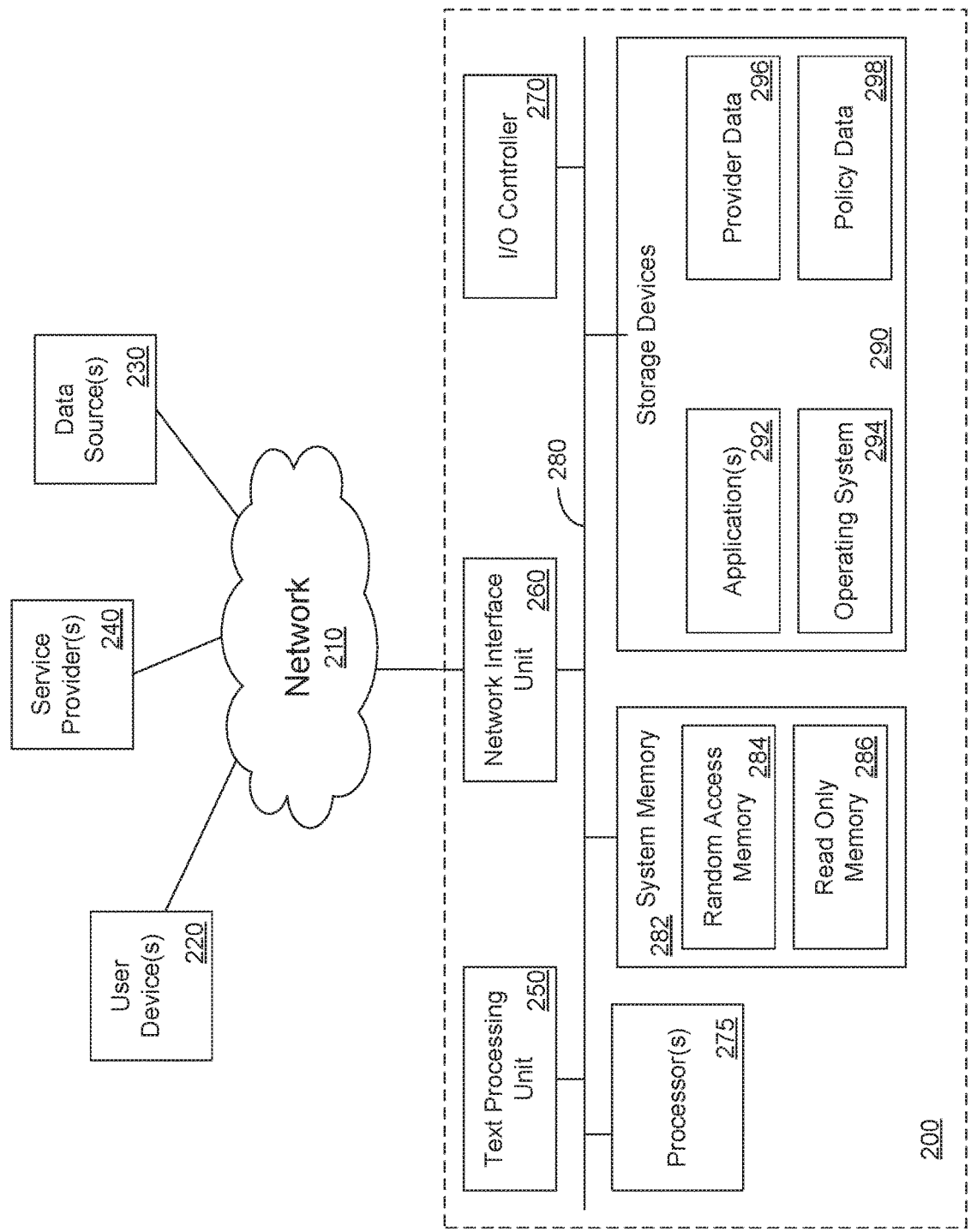
FIG. 2 is block diagram of a system according to some embodiments of the present invention.

Referring now to FIG. 2, one embodiment of the present invention is shown for utilizing social networks for responding to insurance related events associated with different types of insurance policies. As shown in FIG. 2, the insurance processing platform 200 communicates via network 210 to send data to, and receive data from, a plurality of user devices 220 (such as mobile phones, computers, or the like), a plurality of data sources 230 (such as social networking sites, public data sources, or the like), and a plurality of service provider devices 240 to enable an insurance company to provide quick, appropriate and relevant responses and support to insured entities after insurance related events occur.

Platform 200 also may include a number of devices or components, including computer processor(s) 275 and text processing units 250. The computer processor 275 and the text processing unit 250 may include one or more conventional microprocessors and may operate to execute programmed instructions to provide functionality as described herein. Among other functions, the computer processor 275 and/or the text processor 250 may access and retrieve information from data source(s) 230 via network interface unit 260 and input/output controller 270 via system bus 280.

The insurance processing platform 200 may further include a program memory 282 that is coupled to the computer processor 275. The program memory 282 may include a random access memory 284 and a read only memory 286. System memory 282 is further coupled via bus 280 to one or more fixed storage devices 290, such as one or more hard disk drives, flash memories, tape drives or other similar storage devices. Storage devices 290 may store one or more application programs 292, an operating system 294, and one or more databases such as a provider database 296 for storing data identifying service providers that may be used in conjunction with providing services to insured entities, as well as a policy database 298 for storing data associated with a plurality of insurance policies.

Platform 200 may be, according to some embodiments, accessible via a Graphical User Interface (GUI) rendered at least in part by input/output controller 270. The GUI might be used, for example, to dynamically display information associated with insured entities, policies, and insurance related events. Further, the GUI may be used to display information about one or more private social networks or support networks that have been established in response to one or more insurance related events, allowing a user to view and otherwise interact with the insured entity and one or more service providers associated with the support network. For example, in some embodiments, a user interface such as that shown and described below in conjunction with FIG. 7 may be used by an insurance company claim handler operating a device to display and interact with data associated with the support network.

Referring still to FIG. 2, the platform 200 performs processing to receive, process and extract relevant information from data source(s) 230 (such as social network data). The processing and extraction of information from the data source(s) 230 may take one or more of a number of different forms (as will be described in the various embodiments introduced further below). For example, the processing platform 200 may monitor or search for activity associated with certain known policy holders to identify insurance related events or occurrences in which a policy coverage or benefit may be triggered. As another example, the processing platform 200 may perform actions to verify or validate insurance related events, or to identify one or more relevant service providers that are available to provide support to an insured entity after an insurance related event has occurred. Other examples will be introduced in the embodiments described below. The search and processing of processing platform 200 may involve the use of natural language processing techniques to determine whether certain search, posting, or other activities of consumers contain, in substance, information relevant to insurance related events.

It is contemplated that the processing platform 200 may process data and information in one or more languages, such English, French, Arabic, Spanish, Chinese, German, Japanese and the like. In an exemplary embodiment, underwriting analysis by the platform 200 also can be employed for sophisticated text analyses, wherein text can be recognized irrespective of the text language. The relationships between the various words/phrases can be clarified by using an insurance rules engines for classifying words/phrases as a predictor of certain underwriting risk.

Pursuant to some embodiments, the insurance processing system of the present invention may be used to more proactively offer assistance when policy coverage is triggered. For insured individuals and businesses, insurance coverage provides a hedge against the risk of a loss. The loss typically involves the occurrence of an event, such as an auto accident, a fire, etc. Pursuant to some embodiments, social media and other data sources are used to identify events that involve customers of an insurance company and, based on the customer's policy and the type of event, allow the insurance company to proactively provide assistance, loss remediation services, and other policy benefits. As an example, if an insured is involved in a car accident while on a trip, social media, or other data sources (such as data from an OnStar system, or from the insured's mobile phone) may be monitored so that the insurance company is made aware of the event as it happens (or within a short time of the accident). Then, based on the nature of the event and the insured's policy, the insurance company can proactively provide assistance. For example, an instant private social network or support network may be established for the insured to deal with the event. The instant private social network may be a social circle that connects the insured with one or more service providers that may assist the insured in dealing with the event. For example, the instant network may include car rental agencies, towing services, auto body shops, hotel chains, etc. The insured may interact with others in the group to select and access services and assistance needed to handle the insurance related event.

Figure 3:
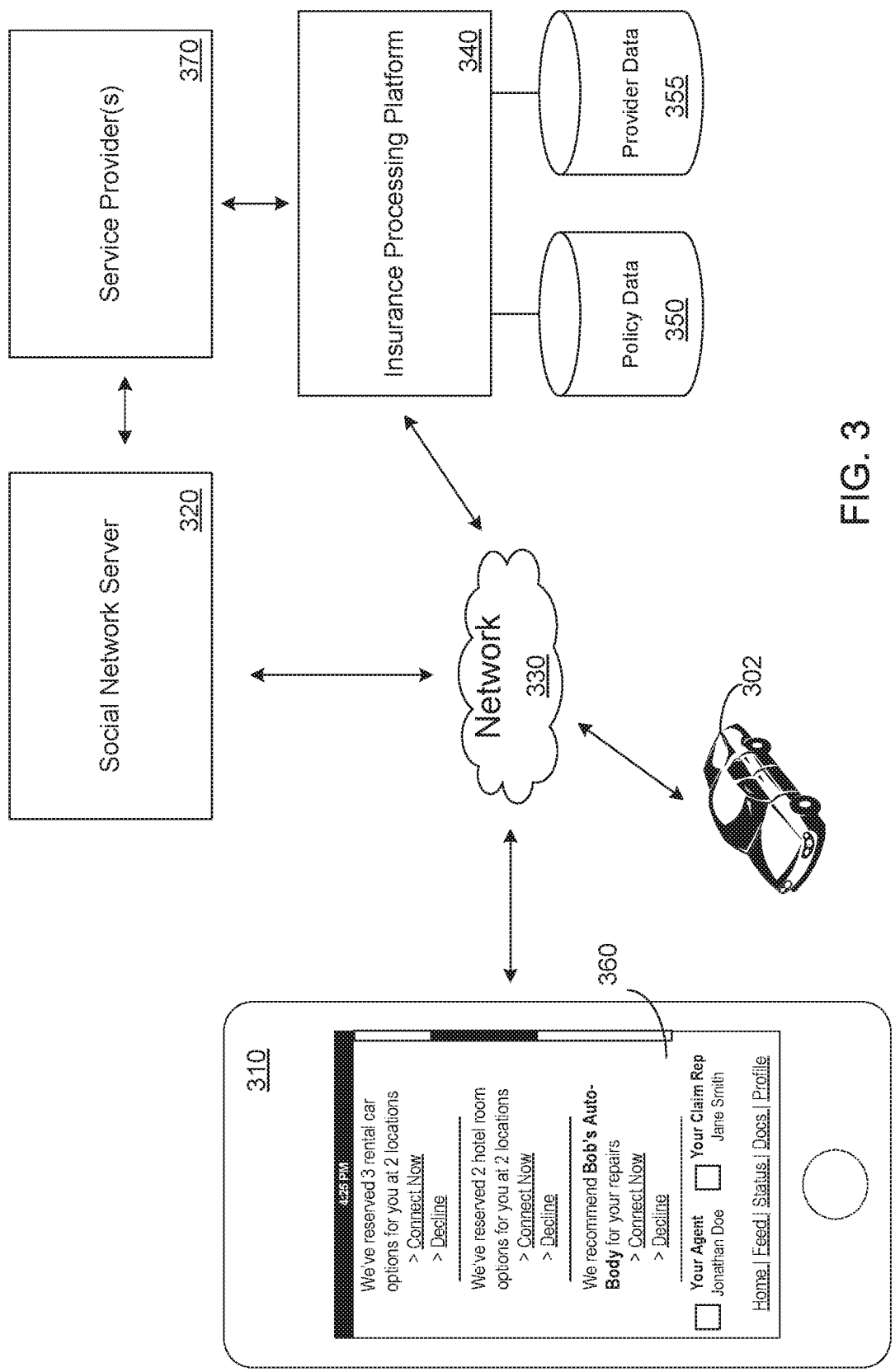
FIG. 3 is block diagram of a system according to some embodiments of the present invention.

Prior to reference to FIG. 3, in which an illustrative embodiment is shown, a brief illustrative (but not limiting) example will be provided. In the illustrative example, a consumer has an automobile policy issued by an insurance company. The automobile policy includes certain benefits or coverages that are triggered in the event of an automobile accident involving the insured. In the illustrative embodiment, the insurance company operates an insurance processing platform pursuant to the present invention, and allows certain (or all) insured individuals to enjoy proactive policy benefits and assistance pursuant to the present invention. In the example, the insured has chosen to participate in the program, and has registered her mobile device (and installed an insurance benefit application on her mobile device). She has also notified the insurance company of certain social media accounts that she regularly uses (such as, for example, her Twitter feed and her Facebook page). In the example, the insured has also informed the insurance company of her OnStar account information. The insurance company then establishes a monitoring process to monitor those accounts for any information or status updates which may indicate the insured has suffered a loss or accident.

Continuing the example, if the insured is involved in an accident, the insurance company can initiate proactive (and, in some embodiments, automated) policy assistance as soon as an indication of an accident is received (via one or more of the social media accounts, via a phone call, via a text message, via a message from the OnStar system, or the like).

Upon receipt of the indication of an accident, the insurance company may initiate one or more automated and substantially immediate proactive steps to assist the insured. For example, a phone connection between an insurance customer service agent and the insured may be initiated. As another example, a support network or support circle may be triggered, which provides a collection of services appropriate to the type of event or incident and the insured's policy benefits. The support network or support circle may include a number of items of information which provide a single source of information for the insured to receive assistance. The support network may remain active and available to the insured for a period of time (such as until a claim resolution has been reached), or may continue as a historical repository of interactions and information between the insurance company and the insured relating to the event. An example of such an embodiment will now be described by reference to FIG. 3.

Reference is now made to FIG. 3, in which an embodiment of a system 300 configured to provide such proactive policy assistance is shown. As shown, system 300 includes a mobile device 310 in communication with a social network server 320 via network 330. Mobile device 310 may be in further communication with an insurance company operating an insurance processing platform 340 pursuant to the present invention. The mobile device 310 is coupled to capture or otherwise receive data and information associated with social network server 320. More particularly, in some embodiments, the mobile device 310 is configured to display information assembled by the social network server 320 in conjunction with data received from the insurance company 340 to provide proactive assistance to a policyholder. For example, the mobile device 310 may display information relevant to the provision of assistance, loss remediation services, and other policy benefits in the event that an insured suffers a loss or other insurance related event. The insurance company 340 operates systems to process, and administer insurance policies based on data received from social network server 320, mobile device 310 and/or from other devices (such as an OnStar or other communication device associated with the insured, such as the insured's automobile 302).

The insurance processing platform 340 may operate one or more rules engines to process data received from the mobile device 310, social network server 320 and/or from other devices to identify the appropriate processing. For example, when an accident occurs involving an insured, data associated with the event are received by the insurance processing platform 340 and used to identify the insured, the associated policy(s) (and the relevant policy form(s)). Key policy status and billing information may also be identified (e.g., by querying a database such as policy database 350). The policy database 350 may store information associated with the insured, the policy forms, the policy status, the covered vehicle(s), the covered driver(s), as well as policy coverages and services. For example, a policy form which provides for immediate roadside assistance, rental car, towing and travel benefits, may result in a different support network than a policy form that only provides for rental car and towing benefits. Application of the rules engine may cause one or more queries of other databases, including databases of service providers 355. For example, if an insured has immediate roadside assistance benefits as a policy feature, application of the rules engine may cause queries of the service provider database 355 to identify one or more roadside assistance service providers that offer service in the geographical area in which the accident occurred. In some embodiments, application of the rules engine may also result in the generation of a first notice of loss ("FNOL") in the insurance processing platform 340.

The mobile device 310 may be any of a number of different types of mobile devices that allow for wireless communication and that may be carried with or by a user. For example, in some embodiments, mobile device 310 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as social network server 320 and/or insurance company 340.

The mobile device 310 is configured to display information relating to policy benefits or assistance relating to the insurance related event on a display screen 360. As shown, the insured has been involved in an accident, and the insurance processing platform 340 has initiated a support network for the insured. Information displayed on the display screen 360 may include information associated with the insured's policy, as well as information allowing the insured to immediately take advantage of one or more policy benefits or features. For example, as shown, the insurance processing platform 340 has identified the location of the insured, and has automatically collected information about a number of service providers 370, including car rental agencies, hotels, and other resources available to the insured which are in close geographic proximity to the insured's current location (as determined by geolocation information transmitted from the mobile device 310 and/or the vehicle 302 or other sources). In some embodiments, the resources may be identified from a provider database 355 maintained by or on behalf of the insurance company. In some embodiments, the resources or service providers 370 may be identified using one or more data APIs, such as the Google Places API or the like. In some embodiments, the insured may view details of the resources (such as information about specific hotels, towing companies, auto repair shops, or the like), and may easily initiate contact with the service providers 370. In some embodiments, contact between the resource providers and the insured may be facilitated by the insurance processing platform 340.

Pursuant to some embodiments, varying levels of interaction between the insured entity and service providers 370 may be facilitated. For example, an insured entity who just experienced an automobile accident may want to initiate a call to a tow truck driver (by clicking on a "call" button on a display screen of the mobile device 310), but may want to have one or more repair shops call her the next morning (by selecting an option to schedule a call from the repair shops to her mobile phone the next morning). Further, the insured entity may wish to engage in a three-way call involving an insurance company representative (e.g., by selecting a three-way call option) when discussing repair options with one or more repair shops. Further still, the insured may instead wish to communicate via text messages, emails, or posts in the private social network. In this way, users of mobile devices configured to operate in conjunction with the present invention may receive proactive support in their preferred mode of communication.

Figure 6B:
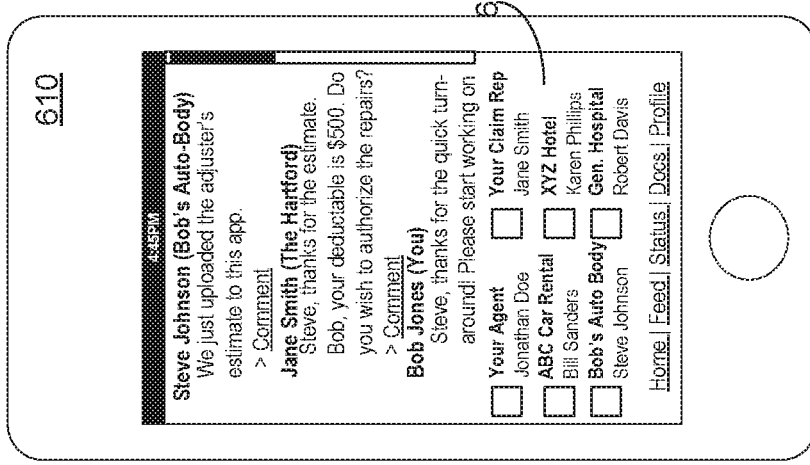
FIGS. 6A and 6B are user interface diagrams depicting further user interfaces according to some embodiments of the present invention.
Figure 6A:
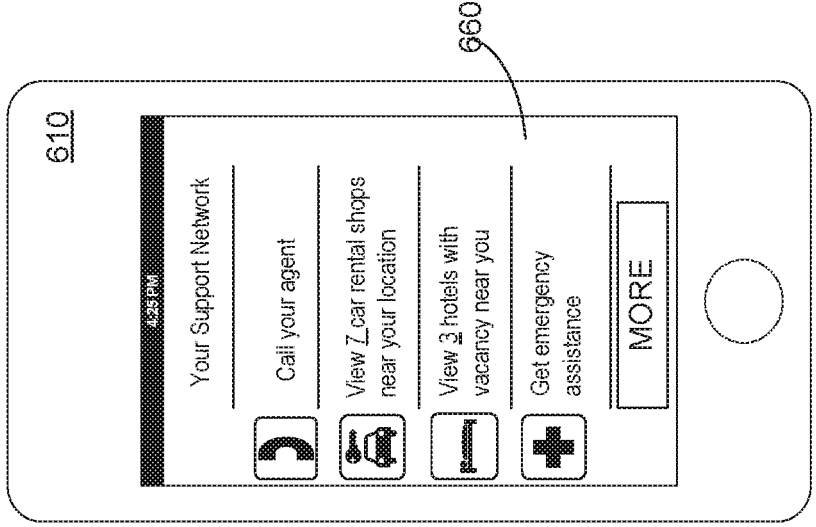

In the user interface depicted in FIG. 3, the mobile device 310 of the insured displays a view of the support network created in response to the accident in which one or more rules have been applied to both identify service providers as well as to initiate transactions with those service providers on behalf of the insured. For example, as depicted, the system has identified that the insured has a policy in which rental car coverage is provided, and the support network has initiated contact with rental car companies and made three different rental car reservations for the insured at two different rental car companies. The insured, operating the mobile device 310, may either decline the options or connect with one or more of the companies to finalize details of the rental. Further, as shown in FIG. 3, application of the rules engine has identified that the insured is eligible for certain hotel benefits (e.g., based on the location of the accident as well as the insured's policy) and two different hotel room options have been reserved. Again, the insured can operate mobile device 310 to finalize the reservation details or decline the options. Those skilled in the art, upon reading this disclosure, will recognize that a wide variety of different services, support features and user interfaces may be provided to insured individuals. For example, in some embodiments, operation of the support network in response to an event may allow the insured to view a list of available service providers, and the insured may review the providers and choose which specific service provider to use. An example of such a user interface is shown in FIG. 6A. In other embodiments, such as the user interface depicted in FIG. 3, operation of the system will automatically initiate reservations with one or more service providers, allowing the insured to simply confirm the reservations.

As a result, insured individuals may receive proactive, and in some instances, substantially instantaneous support and resources from their insurance provider.

Figure 4:
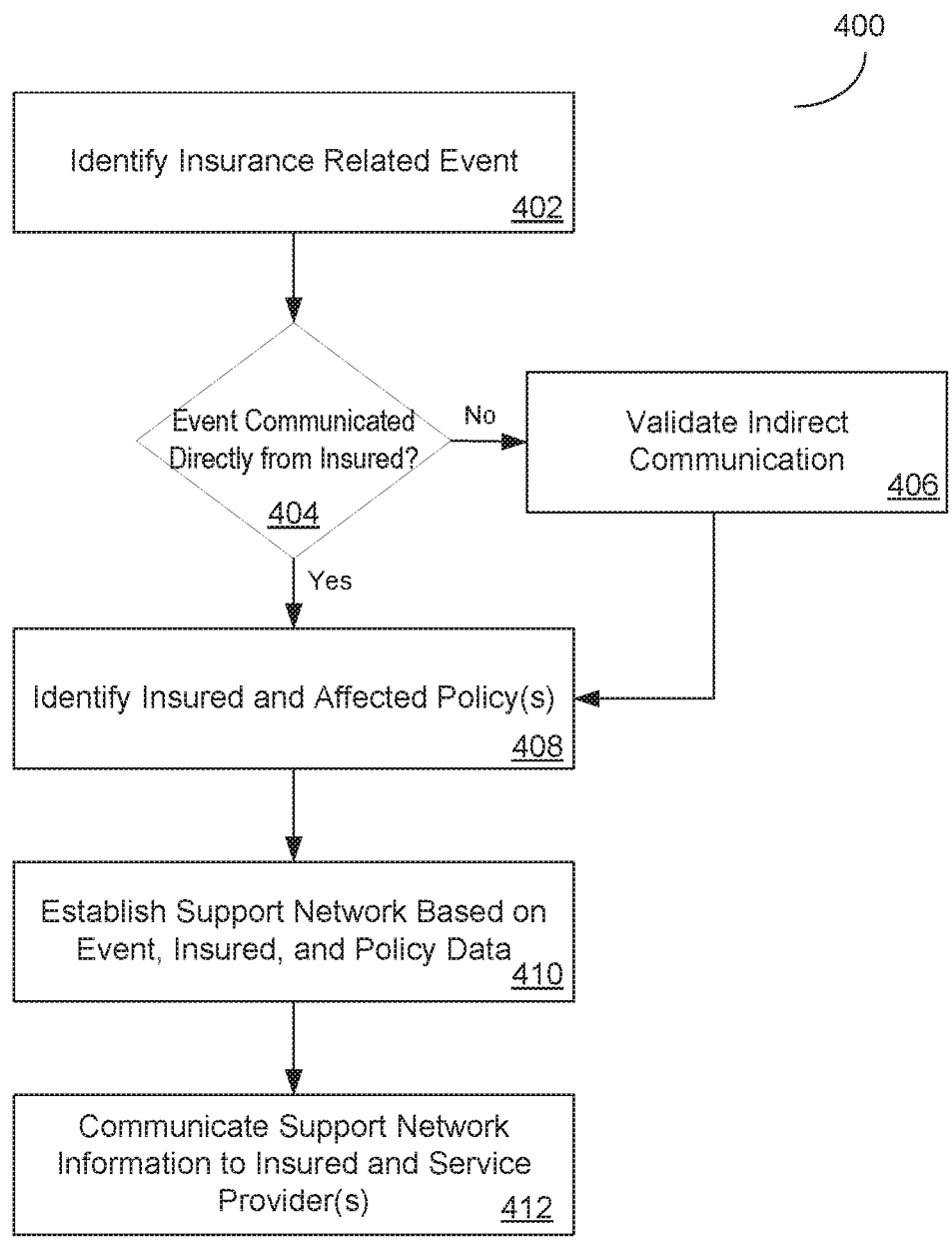
FIG. 4 is a flow diagram of a process according to some embodiments of the present invention.

FIG. 4 is a flowchart of a process 400 for establishing an insurance support network pursuant to some embodiments. The process 400 can be performed by the processing platform 110 (as shown in FIG. 1) or a combination of devices as described herein. The process 400 begins at 402 with the identification of an insurance related event. The identification of an insurance related event may involve a number of different types of communications between a user (such as the insured), a device associated with the user (such as an automobile having a communications system such as the OnStar system, a mobile device, a computing device, or the like) which contains a message or information that is either communicated directly to the insurance processing platform 110 (e.g., by a phone call, a text message, a notification from an insurance processing application installed on a mobile device, or the like), or is communicated indirectly to the insurance processing platform 110 (e.g., via a social network message posted by the insured on a social network monitored by the insurance processing platform 110).

At 404, in some embodiments the insurance processing platform 110 determines how the notification of the event was received. For example, if the notification was directly received from the insured, processing continues at 408. If the notification was indirectly received, processing continues at 406 where the indirect communication is validated. Continuing the illustrative example introduced above, the insurance related event may be an automobile accident. The notification of the event may be directly transmitted from the insured to the insurance company (that is, processing at 404 indicates that the event was communicated directly from the insured).

Figure 5:
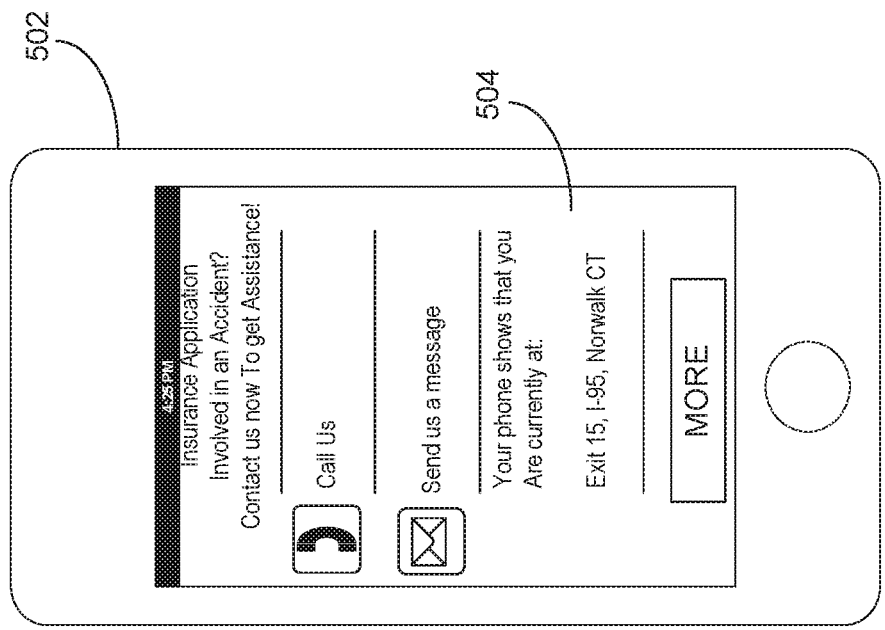
FIG. 5 is a user interface diagram depicting a user interface according to some embodiments of the present invention.

As an example, the insured individual may have a mobile phone that has an insurance processing application installed on it which provides multiple options for communicating the event to the platform 110. In the event that the event notification is transmitted directly to the insurance processing platform 110 (e.g., the insured called, emailed, or otherwise directly notified the insurance company about the event), processing continues at 408 where the insured and any affected policy(s) are identified. An illustrative user interface of such an application is shown in FIG. 5. For example, as shown in FIG. 5, a user has a mobile device 502 which has an insurance processing application installed thereon. The insurance processing application may have been previously installed on the mobile device 502 from an application store such as the Apple iTunes Store, the Android Marketplace, or the like. Pursuant to some embodiments, when the insurance processing application is installed on the mobile device 502, the user may be prompted to enter information about themselves including information identifying their insurance policy(s). The user may also be prompted to specify any contact or communication preferences, as well as emergency contact information. In the event of an accident, the user may launch the insurance processing application on the mobile device 502 and interact with one or more user interfaces 504 to report the event to the insurance company.

For example, as shown in FIG. 5, the user may be presented with one or more contact options which allow quick contact with the insurance company. In some embodiments, the user is also provided with information about their current location (e.g., obtained via geo location resources associated with the mobile device, such as a GPS or cellular location device). In some embodiments, when the user wishes to report the event, information associated with the mobile device 502 and the insurance processing application are automatically transmitted to the insurance processing platform 110 for use in responding to the event. For example, the mobile device 502 may transmit information about the user (including the user's name and policy information) as well as information about the location of the user. Further, in some embodiments, the user may be prompted to provide further information identifying the type of event (such as information specifying that the event is an automobile accident), the severity of the event (whether the automobile is drivable, whether any injuries occurred and the nature of the injuries, whether emergency medical or police assistance is required, and the like).

In some embodiments, an insured (or other individual) may notify the insurance company of an insurance related event indirectly. For example, an insured may post a message or note on a social network which is not necessarily directed solely to the insurance company, but to other individuals and entities as well. As a specific illustrative but not limiting example, an insured who is in an automobile accident may post a status update on her Facebook page notifying her social network of the fact of the accident. Similar updates may be posted on Twitter or other networks. Pursuant to some embodiments, an insurance company operating an insurance processing platform 110 of the present invention may monitor such social networks for updates that suggest that an insurance related event has occurred. The insurance processing platform 110 may execute monitoring processes to monitor the feeds of social networks associated with insured individuals and use natural language processing and other search and text retrieval processes to identify messages (or sets of messages) that suggest an insurance related event has occurred. As an illustrative, but not limiting example, an insured individual who wishes to participate in the system of the present invention may allow the insurance processing platform 110 to monitor specific social network account(s) held by the insured. In some embodiments, the insurance company may be notified of the account(s) when the insured applies for an insurance policy or at a later time.

Pursuant to some embodiments, when the insurance processing platform 110 identifies a possible insurance related event via an indirect communication (e.g., such as via a social media comment or other message), processing may continue at 406 where the indirect communication is validated to ensure that an insurance related event did in fact occur, and that policy benefits and/or assistance are required (or desired) by an insured. The validation of such an indirect communication may occur in any of a number of ways. For example, if a possible insurance related event is identified by monitoring an insured individual's social networking account, and if the insured individual's contact information is known, a phone call may be automatically triggered between a customer service agent and the insured individual so that the customer service agent can verify the event and that policy benefits and/or assistance are required. As another example, a text message, email or the like may be automatically triggered. Processing at 406 may also include validating the indirect communication by obtaining data regarding the event from other sources. As an illustrative example, the insurance processing platform 110 may cause searches to be performed from other data sources to validate the event, such as searches of other social networks for mentions of the event or searches of police or other data sources.

Whether the insurance processing platform identifies an insurance related event as a result of a direct communication from an insured (e.g., via processing at 402, 404) or as a result of an indirect communication from an insured (e.g., via processing at 402, 406), processing continues at 408 where the processing platform identifies the insured and any affected policy(s). In the case where the insured is operating a mobile device having an insurance processing application thereon, information identifying the insured and the insured's policy(s) may be provided as a direct message or interaction between the mobile device and the insurance processing platform (e.g., information identifying the insured and the policy(s) may be stored in the application or accessible via interacting with the application). In other situations, the identification may be inferred from information associated with the information identifying the event (e.g., if an insurance related event is identified by monitoring an insured's Twitter account, the insured's identity and related policies may be looked up based on the Twitter account information).

Once the insured and related policy(s) are identified, processing continues at 410 where the insurance processing platform causes a private social network or support network to be established for use by the insured. The private social network may be automatically created and populated with information associated with the insured's policy data, as well as information about the location of the event and the nature of the event. For example, if the insured is in an auto accident in Norwalk Conn., and the insured lives in Topeka Kans., the private social network may be created with information about relevant service providers in the Norwalk Conn. area. In some embodiments, the relevant service providers are determined based on a set of known or approved providers. In some embodiments, some or all of the relevant service providers are determined based on location and relevance. In some embodiments, the service providers may further be ranked based on user feedback, satisfaction ratings, or the like. Each of the identified service providers, as well as the insured (and one or more customer support specialists) are identified as participants in the support network and are allowed to interact with each other through the support network.

In some embodiments, the creation of the support network is based on the application of one or more rules (e.g., from rules engine 119 of FIG. 1) which are applied based on the nature of the event, the insured's policy information, and other information. As an example, in the case of an auto accident, an accident rules engine may be applied which analyzes data and ensures the appropriate communications are made to the insured as well as to any service providers needed to respond to the accident. In some embodiments, the application of the rules engine may result in the creation of a FNOL on behalf of the insured. Examples of rules applied by the rules engine may include accident criteria or characteristics, geo-location, preferred or approved repair shops, rental car agencies, emergency services, hotel accommodations, towing information (company, if covered), other towing services (if not covered), whether authorities were contacted, and the like.

In some embodiments, if the accident involves other parties (e.g., in the case of a multi-vehicle accident), once information associated with the other parties is obtained (e.g., from the insured operating a mobile device, or from a claims handler), the other parties may be allowed to receive services through the support network as well. For example, a driver of the other vehicle involved in an accident may be eligible to receive roadside assistance, rental car, hotel or other services and may be prompted to download an insurance application onto their mobile device or access a support network from a personal computer or the like.

Once the support network has been created, processing continues at 412 where information about the support network is communicated to each of the participants, including, for example, the insured, the customer support specialist(s), and the identified service providers. The information communicated may include instructions for accessing the network (including user names and passwords) as well as information identifying the nature of the insurance event that the network has been establish to support. Third parties (such as other drivers involved in a multi-vehicle accident, for example) may also receive information to participate in the support network.

Once a support network has been established in response to an event, a number of participants may easily interact with each other to resolve issues associated with the event. For example, referring now to FIG. 6B, the insured may view and interact with the support network using a mobile device 610 (or other computing devices) and interact with other parties, such as the assigned claim representative or handler, the agent, rental car companies, towing companies, repair companies, or the like. As depicted in FIG. 6B, a comment or message stream may be displayed, allowing easy communication between the insured and other participants in the support network.

Figure 7:
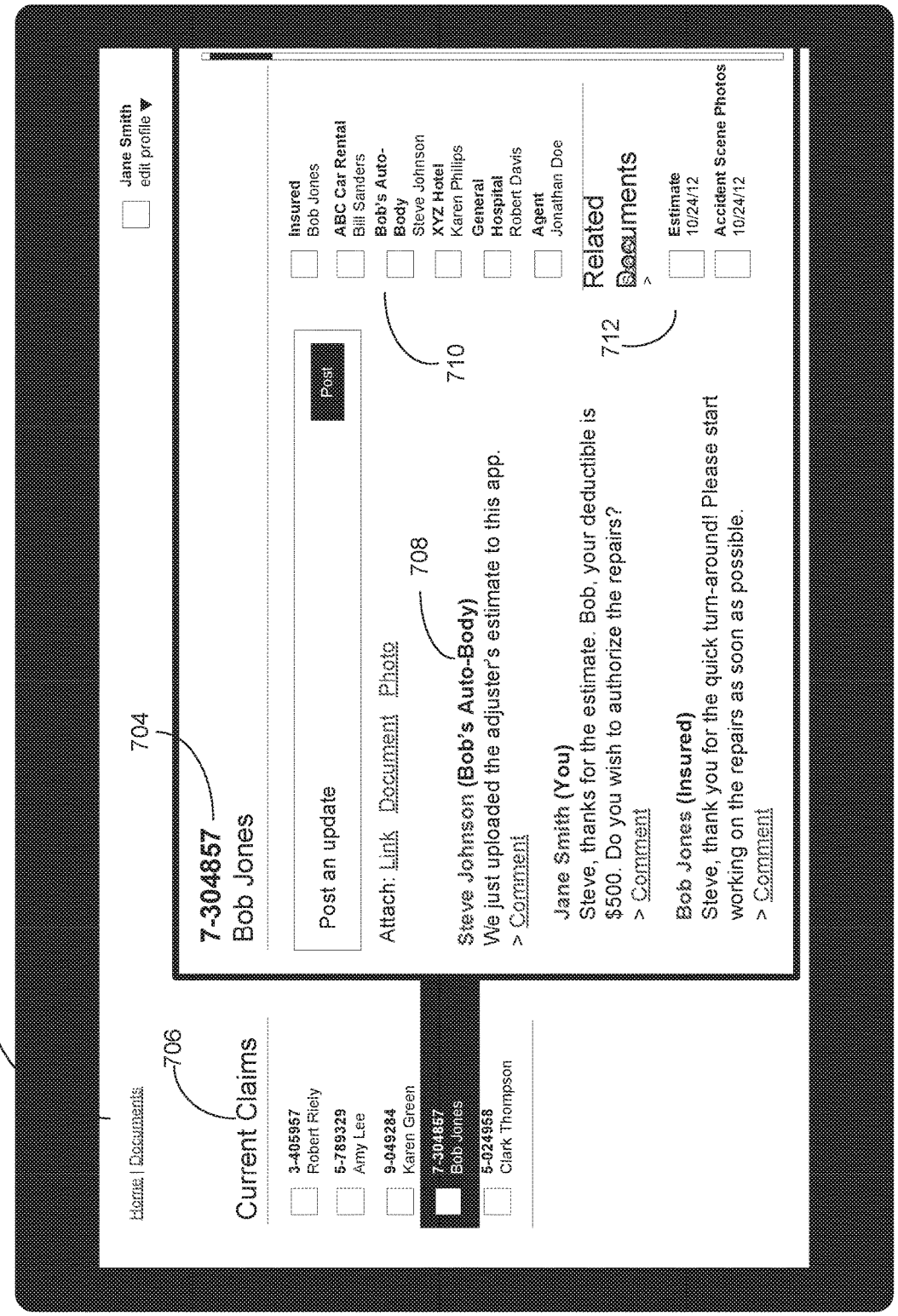
FIG. 7 is a user interface diagram depicting a claim handler user interface according to some embodiments of the present invention.

Other parties in the support network are also able to easily communicate using the present invention. For example, referring now to FIG. 7, insurance company representatives (such as claim handlers) may interact with the support network and other participants using a user interface 700 displayed on a device 702 such as a personal computer, mobile device, or a tablet computer. As depicted in FIG. 7, a claims handler may have the ability to interact with and work on a number of current claims 706. Each claim 706 may be associated with a separate support network that has been established pursuant to the present invention. As shown, a claims handler ("Jane Smith") is interacting with a support network associated with a claim made by "Bob Jones". Information associated with the current claim file 704 may be displayed for ease of reference by the claims handler, as well as a message stream 708 of comments or messages between individuals and entities within the support network that has been established for the current claim file 704. In some embodiments, the message stream 708 may be displayed as a threaded stream of messages, grouping comments, messages and replies to comments or messages together. The message stream 708 may include all messages or interactions between the participants of the support network and may be stored or archived as part of an insurance claim file for future use.

As depicted, a list of the participants in the support network for the current claim file 704 are shown at 710, and the claims handler may message any or all of the participants directly from the user interface. A set of related documents or materials may also be provided at 712. In this manner, a claims handler may easily interact with a number of claims and participate in a number of support networks to resolve issues and provide service and support. Those skilled in the art will appreciate that the user interface 700 may be presented in other layouts, with additional (or different) items of information, and that the specific layout and data shown in FIG. 7 is for illustrative, but not limiting, purposes.

Similar user interfaces may be provided for service providers participating in a support network of the present invention. For example, a service provider such as "Bob's Auto-Body" that has been identified as participating in a support network to resolve claim "7-304857" may be presented with a user interface that allows the service provider to view certain messages associated with their interactions with the claim handler and the insured. In some embodiments the permissions associated with each service provider may be set by a rules engine or by a claims handler to ensure that service providers are able to only access information relevant to their provision of services.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to a processor (such as the processor 275 of FIG. 2, or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computerized private communication group generation system, comprising:
   a hardware network server for monitoring a remote event monitoring network, the remote event monitoring network comprising a plurality of covered entity mobile devices, each of said covered entity mobile devices executing a mobile device application to detect and transmit event data indicative of an occurrence of an event and GPS-based location data, the hardware network server configured to receive the event data and the GPS-based location data from the remote event monitoring network;
   a computer server based processing platform configured to receive event data from the hardware network server, and, responsive to receipt of the event data:
   (a) identify, based at least in part on said event data, covered entity data for a covered entity corresponding to the event data;
   (b) determine, based upon the GPS-based location data, event location data for an event location corresponding to the event data;
   (c) proactively extract resource provider data corresponding to resource providers based upon application of one or more resource eligibility rules to the event data, the covered entity data, the event location data, and at least one resource data application program interface (API) to identify one or more resource providers proximate to the event location, wherein the one or more resource eligibility rules comprise at least benefit eligibility rules to determine eligibility of the covered entity for particular types of benefits;
   (d) generate the computerized private communication group configured to establish on-going private communications among a plurality of selected participants, comprising the covered entity, an event coverage provider, and at least one resource provider of the identified one or more resource providers proximate to the event location;

(e) populate the computerized private communication group with the event data, the covered entity data, and the determined event location data;

(f) generate and transmit by a network interface unit to the mobile device application of one of the plurality of covered entity mobile devices, a covered entity interface including a message stream for enabling on-going communication via the covered entity mobile device with the participants of the computerized private communication group;

(g) generate and transmit by the network interface unit to an event coverage provider computer device, an event coverage provider interface including the message stream for enabling on-going communication via the event coverage provider computer device with the participants of the computerized private communication group; and (h) generate and transmit by the network interface unit to at least one resource provider device a resource provider interface, said resource provider interface configured to display, based on permission rules, a portion of the message stream, said resource provider interface enabling on-going communications by the at least one resource provider with the participants of the computerized private communication group.

2. The system of claim 1, wherein the processing platform being configured to proactively extract resource provider data comprises the processing platform being configured to:

identify, based at least in part on the event location data and the at least one resource data API, one or more resource providers proximate to an event location corresponding to the event location data; and generate an interface, for display on the computerized private communication group, including information concerning the one or more resource providers proximate to the event location.

3. The system of claim 2, wherein the one or more resource eligibility rules further comprise resource provider approval rules to identify resource providers approved for a type of the event.

4. The system of claim 1, wherein the processing platform is further configured to:

receive, from a covered entity device, proprietary network data identifying at least one proprietary network utilized by the covered entity;

monitor the at least one proprietary network for event data corresponding to the covered entity;

responsive to detection, by the monitoring, of the event data, determine whether the event data was received directly from the covered entity or indirectly from the at least one proprietary network;

responsive to a determination that the event data was received indirectly from the at least one proprietary network, generate one of an SMTP communication, an SMS communication, or one of a PSTN or IP telephone call, to the covered entity, to validate occurrence of said event, or validate the occurrence of the event based upon information posted on at least a second proprietary network; and responsive to one of: a determination that the event data was received directly from the covered entity, and affirmative validation of the event data that was indirectly received, perform steps (a)-(h).

5. The system of claim 4, wherein the processing platform is configured to proactively extract the resource provider data to identify the one or more resource providers proximate to the event location responsive to one of the determination that the event data was received directly from the covered entity and the affirmative validation of the event data that was indirectly received.

6. The system of claim 1, wherein the processing platform is further configured to generate an interface, for display on a covered entity device, including data indicative of each of the identified one or more resource providers proximate to the event location, and, for each of the identified one or more resource providers proximate to the event location, a first selectable option to decline a corresponding resource provider, and a second selectable option to generate a real-time connection with the corresponding resource provider.

7. The system of claim 4, wherein said event data being received directly from said covered entity comprises said event data being received by at least one of (i) an email communication, (ii) a telephone communication, and (iii) a communication from a device associated with said covered entity.

8. A computer-implemented method for generating a computerized private communication group, comprising:

(a) receiving, by a network server, event data indicative of an occurrence of an event, and GPS-based location data, from a mobile device application installed on one of a plurality of covered entity mobile devices;

(b) identifying, by a computer server based processing platform based at least in part on the event data, covered entity data for a covered entity corresponding to the event data;

(c) determining, by the processing platform based upon the GPS-based location data, event location data corresponding to the event;

(d) proactively extracting, by the processing platform, resource provider data corresponding to one or more resource providers identified based upon the event data, the covered entity data, the event location data, and at least one resource data application program interface (API);

(e) generating, by the processing platform, a computerized private communication group configured to establish private communications among participants, including at least the covered entity, an event coverage provider, and at least one resource provider of the identified one or more resource providers;

(f) populating, by the processing platform, the computerized private communication group with the event data, the covered entity data, and the determined event location data;

(g) generating and transmitting by a network interface unit to the mobile device application of a covered entity mobile device, a covered entity interface including a message stream for enabling on-going communication via the covered entity mobile device with the participants of the computerized private communication group;

(h) generating and transmitting by the network interface unit to an event coverage provider computer device, an event coverage provider interface including the message stream for enabling on-going communication among the participants of the computerized private communication group; and (i) generating and transmitting by the network interface unit to the at least one resource provider device a resource provider interface, said resource provider interface configured to display, based on permission rules, a portion of the message stream, said resource provider interface enabling on-going communications by the at least one resource provider with the participants of the computerized private communication group.

9. The computer-implemented method of claim 8, further comprising:
identifying, by the processing platform, based at least in part on application of one or more resource eligibility rules to the event data, the event location data, and the at least one resource data API, one or more resource providers proximate to the event location corresponding to the event location data; and
generating, by the processing platform, an interface for display on the computerized private communication group, said interface including data indicative of the one or more identified resource providers proximate to the event location.

10. The computer-implemented method of claim 8, further comprising:
receiving, by the processing platform from one of the plurality of covered entity devices, proprietary network data identifying at least one proprietary network utilized by the covered entity;
monitoring, by the processing platform, the at least one proprietary network for posting of event data corresponding to the covered entity;
responsive to receipt, based on the monitoring, of event data, determining, by the processing platform, whether the event data was received directly from the covered entity or indirectly from the at least one proprietary network;
responsive to a determination that the event data was received indirectly from the at least one proprietary network, generating one of an SMTP communication, an SMS communication, or one of a PSTN or IP telephone call to the covered entity to validate occurrence of said event; and
responsive to one of: a determination that the event data was received directly from the covered entity, and affirmative validation of the event data that was indirectly received, performing, by the processing platform, steps (b)-(i).

11. The computer-implemented method of claim 10, further comprising, responsive to one of the determination that the event data was received directly from the covered entity and affirmative validation of the event data that was indirectly received:
determining, by the processing platform, one or more resource eligibility rules associated with the event;
identifying, by the processing platform based at least in part on the one or more resource eligibility rules and the event location data, one or more resource providers proximate to the event location; and
generating, by the processing platform, an interface for display on a user device via the computerized private communication group, said interface including each of the one or more identified one or more resource providers proximate to the event location, and, for each of the one or more identified one or more resource providers proximate to the event location, a first selectable option to decline a corresponding resource provider, and a second selectable option to generate a real-time connection with the corresponding resource provider.

12. The computer-implemented method of claim 11, wherein the one or more resource eligibility rules comprise policy rules based on a policy providing resource coverage to the covered entity for the events.

13. The computer-implemented method of claim 8, further comprising transmitting to each of the covered entity mobile device, the event coverage provider computer device, and the at least one resource provider device, access instructions including user at least a user name and password to provide the covered entity, the event coverage provider, and the at least one resource provider access to said computerized private communication group.

14. The computer-implemented method of claim 8, where the covered entity data comprises coverage data indicative of a type and quantity of coverage applicable to the event.

15. The computer-implemented method of claim 8, wherein the at least one resource provider device comprises at least one of an auto repair provider device, a rental car provider device, a hotel room provider device, and a towing resource provider device.

16. A message stream display system, comprising:
a network interface unit, configured to:
generate and transmit to a covered entity mobile device, a remote interface including a message stream for enabling on-going communication, via the covered entity mobile device, with participants of a computerized private communication group, including a covered entity corresponding to the covered entity mobile device and an event coverage provider;
generate and transmit to an event coverage provider computer device, an event coverage provider interface including the message stream for enabling on-going communication via the event coverage provider computer device with the participants of the computerized private communication group; and
generate and transmit to at least one resource provider device a resource provider interface, said resource provider interface configured to display, based on permission rules, a portion of the message stream, said resource provider interface enabling on-going communications by the at least one resource provider with the participants of the computerized private communication group;
a hardware server, configured to monitor, and to receive event data indicative of an event and GPS-based location data, from, a remote event monitoring network, the remote event monitoring network comprising a plurality of covered entity mobile devices, each of the covered entity mobile devices executing a mobile device application to detect and transmit the event data and the GPS-based location data; and
a computer server based processing platform, in communication with the hardware server and the network interface unit, configured to, responsive to receipt of the event data and the GPS-based location data:
(a) determine, based on the received data, a covered entity and an event location corresponding to the event data;
(b) proactively extract resource provider data corresponding to resource providers identified based upon the event data, the covered entity data, the event location data, and at least one resource data application program interface (API);
(c) generate a computerized private communication group among the covered entity, the covered entity, the event coverage provider, and the at least one resource provider of the identified resource providers; and (d) populate the computerized private communication group with the event data, the covered entity data, and the determined event location data.

17. The system of claim 16, wherein the processing platform being configured to proactively extract resource provider data comprises the processing platform being configured to:
   identify, based at least in part on the event location data and the at least one resource data API, one or more resource providers proximate to an event location corresponding to the event location data; and
   generate an interface, for display on the computerized private communication group, including information concerning the one or more resource providers proximate to the event location.

18. The system of claim 17, wherein the processing platform being configured to identify the one or more resource providers proximate to the event location further comprises the processing platform being configured to apply one or more resource eligibility rules to the event data to identify resource providers approved for a type of the event.

19. The system of claim 16, wherein the processing platform is further configured to:
   receive, from a covered entity device, proprietary network data identifying at least one proprietary network utilized by the covered entity;
   monitor the at least one proprietary network for event data corresponding to the covered entity;
   responsive to detection, by the monitoring, of the event data, determine whether the event data was received directly from the covered entity or indirectly from the at least one proprietary network;
   responsive to a determination that the event data was received indirectly from the at least one proprietary network, generate one of an SMTP communication, an SMS communication, or one of a PSTN or IP telephone call, to the covered entity, to validate occurrence of said event, or validate the occurrence of the event based upon information posted on at least a second proprietary network; and
   responsive to one of: a determination that the event data was received directly from the covered entity, and affirmative validation of the event data that was indirectly received, perform steps (a)-(d).

20. The system of claim 1, wherein the benefit eligibility rules comprise towing benefits eligibility rules, hotel benefits eligibility rules, and vehicle rental benefits eligibility rules.

* * * * *